(12) United States Patent
Miller

(10) Patent No.: US 8,576,118 B2
(45) Date of Patent: Nov. 5, 2013

(54) SATELLITE PERFORMANCE MONITORING

(75) Inventor: Mark J. Miller, Vista, CA (US)

(73) Assignee: ViaSat, Inc., Carlsbad, CA (US)

( * ) Notice: Subject to any disclaimer, the term of this patent is extended or adjusted under 35 U.S.C. 154(b) by 939 days.

(21) Appl. No.: 12/361,403

(22) Filed: Jan. 28, 2009

(65) Prior Publication Data

US 2009/0195444 A1     Aug. 6, 2009

Related U.S. Application Data

(60) Provisional application No. 61/024,522, filed on Jan. 29, 2008.

(51) Int. Cl.
*H04B 7/185* (2006.01)

(52) U.S. Cl.
USPC .......... 342/352; 455/12.1; 455/427; 455/430; 455/135; 455/226.3

(58) Field of Classification Search
None
See application file for complete search history.

(56) References Cited

U.S. PATENT DOCUMENTS

| | | | | |
|---|---|---|---|---|
| 6,091,933 | A * | 7/2000 | Sherman et al. | 455/13.1 |
| 6,181,912 | B1 * | 1/2001 | Miller et al. | 455/12.1 |
| 6,801,565 | B1 * | 10/2004 | Bottomley et al. | 375/148 |
| 2002/0060641 | A1 | 5/2002 | Fang | |
| 2002/0101937 | A1 * | 8/2002 | Antonio et al. | 375/297 |
| 2003/0040274 | A1 | 2/2003 | Dai et al. | |
| 2003/0073436 | A1 * | 4/2003 | Karabinis et al. | 455/429 |
| 2004/0131028 | A1 | 7/2004 | Schiff et al. | |
| 2004/0146038 | A1 | 7/2004 | Dale et al. | |
| 2005/0141473 | A1 | 6/2005 | Lim et al. | |
| 2005/0266805 | A1 * | 12/2005 | Jensen | 455/82 |

FOREIGN PATENT DOCUMENTS

WO     WO 2009/097324 A2     8/2009

OTHER PUBLICATIONS

International Search Report for PCT/US2009/032223, mailed on Aug. 21, 2009, 3 pages total.
International Preliminary Report on Patentability and Written Opinion for PCT/US2009/032223, mailed on Aug. 12, 2010, 5 pages total.
Office Action for U.S. Appl. No. 12/361,417, mailed on Aug. 3, 2011.

* cited by examiner

*Primary Examiner* — Yuwen Pan
*Assistant Examiner* — Fanghwa Wang
(74) *Attorney, Agent, or Firm* — Kilpatrick Townsend & Stockton LLP

(57) ABSTRACT

Techniques for monitoring transmission performance of a satellite communications systems are provided, including techniques for measuring the primary contributors to the end-to-end SNR, including the uplink SNR, the downlink SNR, and the C/I for each link in the network. These individual measurements are used to estimate satellite effective isotropic radiated power (EIRP), satellite antenna gain-to-noise-temperature (G/T), and loss due to an Earth Terminal pointing error. The EIRP, satellite antenna G/T and loss due to Earth terminal pointing error may then be used to determine operating parameters for the satellite communications network that enable the network to operate more efficiently.

9 Claims, 4 Drawing Sheets

SATELLITE PERFORMANCE MONITORING

CROSS-REFERENCES TO RELATED APPLICATIONS

This application claims the benefit of priority to U.S. Provisional Application No. 61/024,522, titled "Satellite Performance Monitoring System", filed Jan. 29, 2008, the content of which is hereby incorporated by reference for all purposes.

BACKGROUND OF THE INVENTION

The present invention relates to satellite communication systems and, particularly to satellite performance monitoring systems.

A hub-spoke, spot beam satellite system faces many impairments that contribute to the end-to-end signal to noise-plus-interference (SINR) ratio of a given link. The most common contributions to the end-to-end SINR include uplink signal-to-noise ratio (SNR), downlink SNR, and internal system inference, such as that caused by other beams or other users in other beams. For example, internal system interference may result from other beams emanated from a multi-beam antenna of a satellite and/or may also result from interference from beams transmitted from other Earth terminals.

In a typical satellite system design, no one term dominates the overall link budget. From a perspective of network operation, configuration, and trouble-shooting, having access to measurements of the primary contributors to the end-to-end SINR, especially the uplink SNR, the downlink SNR, and the carrier-to-interference ratio (C/I) would be useful for optimizing the efficiency of the satellite communications network.

Accordingly, techniques for determining the primary components of the end-to-end SINR for use in optimizing the configuration of a satellite communication system are desired.

BRIEF SUMMARY OF THE INVENTION

Techniques for monitoring transmission performance of a satellite communications systems are provided, including techniques for measuring the primary contributors to the end-to-end SNR, including the uplink SNR, the downlink SNR, and the C/I for each link in the network. These individual measurements are used to estimate satellite effective isotropic radiated power (EIRP), satellite antenna gain-to-noise-temperature (G/T), and loss due to an Earth Terminal pointing error. The EIRP, satellite antenna G/T and loss due to Earth terminal pointing error may then be used to determine operating parameters for the satellite communications network that enable the network to operate more efficiently.

According to an embodiment of the present invention, a method for monitoring the performance of a satellite communication system is provided. The method includes measuring, at a gateway terminal, a total receive power of a signal received from a satellite under normal operating conditions, and measuring a signal only power and/or a signal to noise plus interference ratio (SINR) for a signal received from the satellite under normal operating conditions. The method further comprises measuring a total thermal noise component of the signal received from the satellite, measuring a downlink thermal noise component of the signal received from the satellite, and calculating satellite communication system operating parameters using the total receive power, the signal only power and/or the SNR, the total thermal noise component, and the downlink thermal noise component measurements.

Other features and advantages of the invention will be apparent in view of the following detailed description and preferred embodiments.

DETAILED DESCRIPTION OF THE INVENTION

Figure 1:
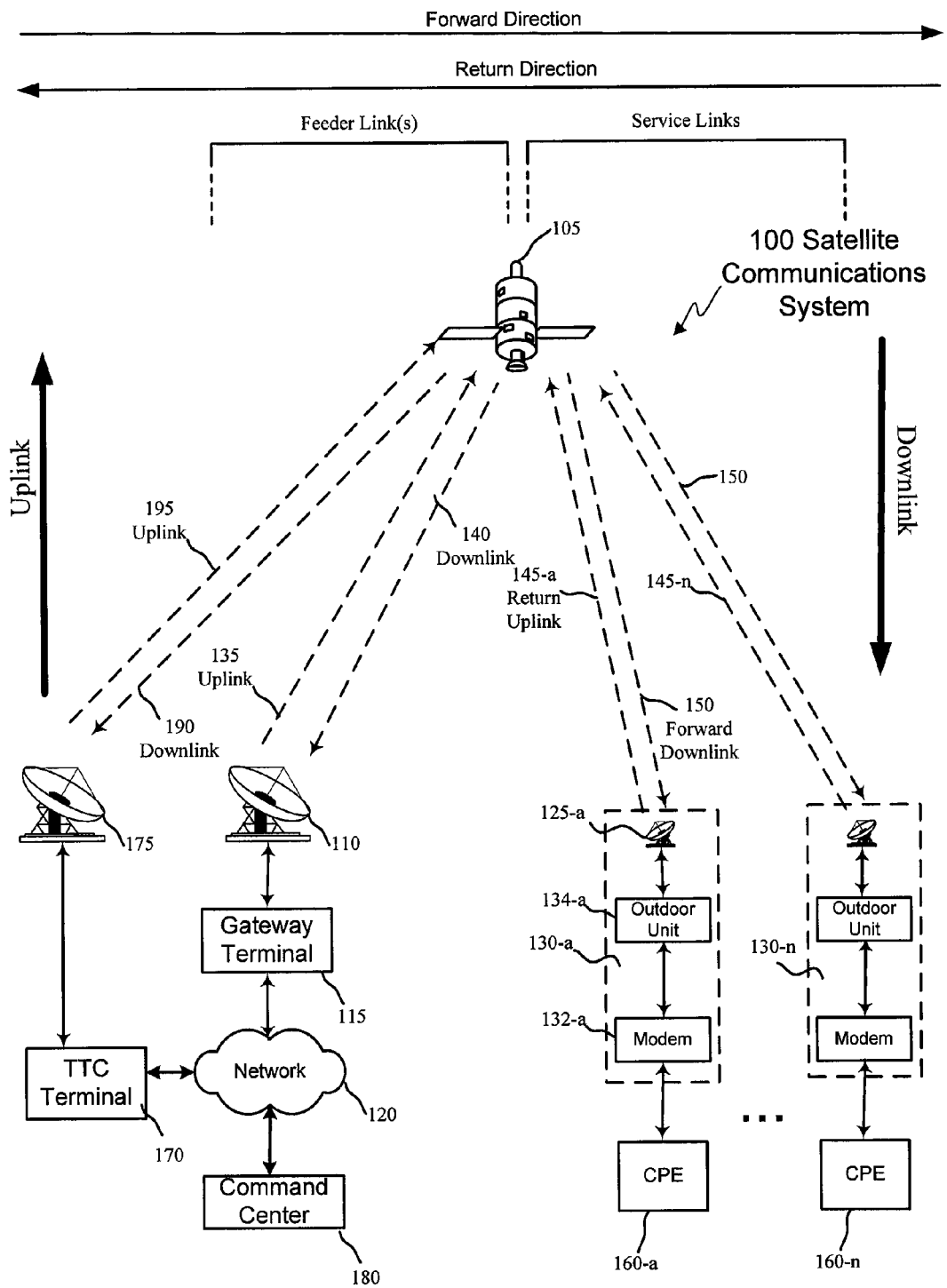
FIG. 1 is a block diagram illustrating a satellite communications system that may be used with the techniques for monitoring performance disclosed herein according to an embodiment of the present invention.

FIG. 1 is a block diagram of an exemplary satellite communications system 100 for which the performance may be monitored using the techniques disclosed herein according to an embodiment of the present invention. Satellite communications system 100 includes a network 120, such as the Internet, interfaced with one or more gateway terminals 115 that is configured to communicate with one or more user terminals 130, via a satellite 105. System 100 also includes one or more telemetry, tracking, and control (TTC) terminals 170.

Gateway terminal 115 is sometimes referred to as a hub, gateway terminal, or ground station and services the uplink 135, downlink 140 to and from satellite 105. Although only one gateway terminal 115 is shown, embodiments of the present invention may have a plurality of gateway terminals coupled to network 120. Gateway terminal 115 schedules traffic to the user terminals 130, although other embodiments could perform scheduling in other parts of the satellite communication system 100.

A satellite communications system 100 applicable to various embodiments of the invention is broadly set forth herein. In this embodiment, there is a predetermined amount of frequency spectrum available for transmission. The communication links between the gateway terminals 115 and satellite 105 may use the same or overlapping frequency spectrums with the communication links between satellite 105 and the user terminals 130 or could use different frequency spectrums.

Network 120 may be any type of network and can include, for example, the Internet, an IP network, an intranet, a wide-area network (WAN), a local-area network (LAN), a virtual private network (VPN), a virtual LAN (VLAN), a fiber optical network, a hybrid fiber-coax network, a cable network, the Public Switched Telephone Network (PSTN), the Public Switched Data Network (PSDN), a public land mobile network, and/or any other type of network supporting data communication between devices described herein, in different embodiments. Network 120 may include both wired and wireless connections, including optical links. As illustrated in a number of embodiments, the network may connect gateway terminal 115 with other gateway terminals (not pictured), which are also in communication with satellite 105. All gateway terminals in communication with satellite 105 may also connect with a command center 180.

Gateway terminal 115 provides an interface between network 120 and satellite 105. gateway terminal 115 may be configured to receive data and information directed to one or more user terminals 130, and can format the data and information for delivery to the respective destination device via satellite 105. Similarly, gateway terminal 115 may be configured to receive signals from satellite 105 (e.g., from one or more user terminals 130) directed to a destination connected with network 120, and can format the received signals for transmission with network 120. Gateway terminal 115 may use a broadcast signal, with a modulation and coding ("modcode") format adapted for each packet to the link conditions of the terminal 130 or set of terminals 130 to which the packet is directed.

Command center 180 connected to network 120 may communicate with each gateway terminal 115 in the network and satellite 105. Gateway terminals 115 may be generally located remote from the actual user terminals 130 to enable frequency re-use.

Gateway terminal 115 may use an antenna 110 to transmit the uplink signal to satellite 105. In one embodiment, antenna 110 comprises a parabolic reflector with high directivity in the direction of satellite 105 and low directivity in other directions. Antenna 110 may comprise a variety of alternative configurations and include operating features such as high isolation between orthogonal polarizations, high efficiency in the operational frequency bands, and low noise.

In one embodiment of the present invention, a geostationary satellite 105 is configured to receive the signals from the location of antenna 110 and within the frequency spectrum transmitted. Satellite 105 may, for example, use a reflector antenna, lens antenna, phased array antenna, active antenna, or other mechanism known in the art for reception of such signals. The signals received from the gateway 115 are amplified with a low-noise amplifier (LNA) and then frequency converted for changing the power levels and frequencies. Satellite 105 may process the signals received from the gateway 115 and forward the signal from the gateway 115 to one or more user terminals 130. In one embodiment of the present invention, the frequency-converted signals are passed through a bank of filters that separate the various frequency-converted signals having different bandwidth. A switch may select one of the various frequency-converted signals, which is then further amplified by Traveling Wave Tube Amplifiers (TWTA) to produce the desired Equivalent Isotropically Radiated Power (EIRP) at the payload antenna output. The high-power transmission signal passed through a transmit reflector antenna (e.g., a phased array antenna) that forms the transmission radiation pattern (spot beam). In one embodiment of the present invention, satellite 105 may operate in a multiple spot-beam mode, transmitting a number of narrow beams each directed at a different region of the earth, allowing for segregating user terminals 130 into the various narrow beams.

In some embodiments of the present invention, satellite 105 may be configured as a "bent pipe" satellite, wherein satellite 105 may frequency and polarization convert the received carrier signals before retransmitting these signals to their destination, but otherwise perform little on the contents of the signals. A spot beam may use a single carrier, i.e., one frequency or a contiguous frequency range per beam. A variety of physical layer transmission modulation and coding techniques may be used by satellite 105 in accordance with certain embodiments of the invention. Adaptive coding and modulation can be used in some embodiments of the present invention.

For other embodiments of the present invention, a number of network architectures consisting of space and ground segments may be used, in which the space segment is one or more satellites while the ground segment comprises of subscriber terminals, gateway terminals or gateways, network operations centers (NOCs) and a satellite and gateway terminals command center. The gateway terminals and the satellites can be connected via a mesh network or a star network, as evident to those skilled in the art. In one embodiment of the present invention, command center 180 is connected to network 120 and is operative to transmit instructions to the satellite and each participating gateway terminal in the GSO communication system. In another embodiment, the command center may be located at one geographical region and/or co-located with one of the gateway terminals 115. And yet in another embodiment, the command center may be distributed amongst multiple geographical regions and/or amongst several gateway terminals. In yet another embodiment, the command center may be mobile and coupled to the network through a cellular link or a wireless metropolitan (MAN) or a wide area network (WAN) link. The command center may be equipped with RF measurement equipment for measuring and evaluating interference characteristics.

The downlink signals may be transmitted from satellite 105 to one or more user terminals 130 and received with the respective subscriber antenna 125. In one embodiment, the antenna 125 and terminal 130 together comprise a very small aperture terminal (VSAT), with the antenna 125 measuring approximately 0.6 meter in diameter and having approximately 2 watts of power. In other embodiments, a variety of other types of antennas 125 may be used at the subscriber terminal 130 to receive the signal from satellite 105. The link 150 from satellite 105 to the user terminals 130 may be referred to hereinafter as the forward downlink 150. Each of the user terminals 130 may comprise a single user terminal or, alternatively, comprise a hub or router (not pictured) that is coupled to multiple user terminals. In one embodiment, subscriber terminal 130 may comprise a receiver including a bandpass filter bank adapted to let through a GSO frequency spectrum and an extended frequency spectrum. Each subscriber terminal 130 may be connected to various consumer premises equipment (CPE) 160 comprising, for example computers, local area networks, Internet appliances, wireless networks, etc.

TTC terminal 170 provides an interface for monitoring and controlling satellite 105. For example, TTC terminal 170 may receive status information from satellite 105, send commands to satellite 105, and track the position of satellite 105. In the present embodiment, TTC terminal 170 is connected to command center 180 via network 120, and TTC terminal 170 is configured to receive commands from command center 180 and to send information, such as the status of satellite 105, to command center 180. TTC terminal 170 may be an independent terminal, as shown in the figure, or may alternatively be implemented in a terminal 115 that also carries traffic data.

According to some alternative embodiments, TTC terminal 170 may be in direct communication with command center 180 or may be integrated into command center 180, or may be integrated into gateway terminal 115. TTC terminal 170 communicates with satellite 105 using an antenna 175. Antenna 175 may be substantially similar to antenna 110 or may comprise a different configuration. Uplink 195 represents a command uplink from TTC terminal 170 for sending commands to satellite 105. Downlink 190 represents a telemetry downlink from satellite 105 for receiving data from satellite 105, such as data representing the position of satellite 105. TTC terminal 170 may be located remote from gateway terminals 115 and user terminals 130. These links may be in-band with the user data links 135 and 140, or alternatively use another set of frequencies.

According to embodiments of the present invention, a modem within gateway terminal 115 measures several operating parameters of satellite communication system 100 while satellite communications system 100 is operating. These operating parameters include: (1) total receive power (S+N+I), (2) signal only power (S), and (3) end-to-end signal to noise plus interference (SINR). The total receive power includes the signal power (S) of a signal received from satellite 105, a total noise power (N) representing noise introduced by sources other than satellite 105, and interference power (I) representing the amount of co-channel interference.

In order to determine the total noise power (N), all of the gateway terminals are instructed not to transmit any energy to satellite 105. During the interval where there is no uplink energy reradiated by satellite 105, the gateway terminal measures the total receive power, which will be N. For a typical GSO satellite, the interval where there is no uplink energy reradiated by the satellite is approximately 0.25 seconds after the gateway terminals and user terminals disable their uplink transmissions). The value of N may be measured periodically by instructing all of the gateway terminals 115 and user terminals 130 to not transmit any energy to satellite 105.

Measurements are also made to determine the downlink thermal noise ($N_{dl}$) of gateway terminal 115. The measurement of the downlink thermal noise is made while satellite 105 is essentially turned off or a measurement is taken in a portion of the electromagnetic spectrum where the satellite does not radiate.

Using the results of these measurements, the gateway terminal 115 can solve for the components of the link SINR for a link to satellite 105: uplink SNR, downlink SNR, and carrier to interference (C/I) ratio. The link propagation conditions in addition to gateway terminal 115's effective isotropic radiated power (EIRP) and antenna gain-to-noise-temperature (G/T), the satellite can determine the EIRP and G/T of satellite 105 in the direction of gateway terminal 115. According to an embodiment of the present invention, if a satellite communications system, such as satellite communications system 100, includes a plurality of gateway terminals each having known G/T characteristics, the data can be jointly processed to determine an estimate of the pointing error loss for each gateway terminal.

Embodiments of the present invention may include measurements of some or all of the SINR components illustrated in the following equations:

$$M1 = S+N+I \quad (1)$$

$$M2 = S \quad (2)$$

$$M3 = S/(N+I) \quad (3)$$

$$M4 = N = N_{dl} + N_{ul} \quad (4)$$

$$M5 = N_{dl} \quad (5)$$

Measurements M1, M2, and M3 may be made while the network is in normal operating configuration. Measurements M1, M2, and M3 represent the power at some common point in the receiver chain. According to some embodiments, measurements M1, M2, and M3 may be taken at the matched filter outputs (MFOs), which enables the digital signal processing to be used to perform measurements M1, M2, and M3. For example, according to an embodiment, measurement M1 may be performed by summing the square of the channel (in phase channel) MFO and the Q channel (quatrature channel) MFO for $N_{samp}$ samples and then dividing by $N_{samp}$.

Measurement M2 may be obtained by various techniques known in the art. For example, according to some embodiments, M2 may be obtained through techniques that exploit the knowledge of certain symbols, such as unique words or pilot symbols, to estimate the power in the signal component of the matched filter outputs.

Measurement M3 may be obtained by various techniques known in the art for estimating the SINR of a received digitally modulated symbol stream. In order to determine the components of the SINR, only one of measurements M2 and M3 needs to be performed. Techniques for determining the other components of end-to-end SINR when either measurements M2 or M3 are available are described below.

Measurement M4 is made during a "quiet" interval where the uplink transmissions from the plurality of Earth terminals, including gateway terminals 115 and user terminals 130, have been disabled. According to an embodiment, measurement M4 is obtained one single hop delay after the uplink transmissions have been disabled. Measurement M4 involves measuring the total received power and an identical process may be used for measuring the M4 value as the M1 value, except that transmissions from the plurality of gateway terminals 115 and user terminals 130 are disabled before measuring the M4 value. According to an embodiment, measurement M4 includes both the uplink thermal noise generated within the satellite, $N_{ul}$, and the downlink thermal noise generated within gateway terminal 115, $N_{dl}$.

Measurement M5 is made after satellite 105 has been commanded to disable all transmissions. For example, according to an embodiment, satellite 105 may be commanded via an uplink command from command center 180 to disable all transmissions. Satellite 105 is commanded to enter into a state that prevents the re-radiation of uplink thermal noise. Upon entering the transmission disabled state, the resulting power received by gateway terminal 115 should be approximately 20 dB below the level of the thermal noise generated in gateway terminal 115 or lower. According to an embodiment, this state may be achieved by switching in a large attenuation value at some point prior to the satellite high power amplifier (HPA). According to some embodiments of the present invention, uplinks from the plurality of gateway terminals 115 and user terminals 130 may be disabled during this interval to minimize the "off" level attenuation requirements on the satellite. Once the satellite (and the gateway and user terminals in some embodiments) have been placed in the disabled state, the M5 measurement may be obtained using a process similar or identical to the process used to make measurement M1. Measurement M5 only includes the downlink thermal noise generated within gateway terminal 115, $N_{dl}$.

According to an embodiment of the present invention where gateway terminal 115 is configured to perform measurement M2 but not measurement M3, the components of the end-to-end SINR, the downlink SNR, the uplink SNR, and the carrier to interference (C/I) ratio may be computed using the following equations:

$$\left(\frac{S}{N}\right)_{DL} = \frac{M2}{M5} \quad (6)$$

$$\left(\frac{S}{N}\right)_{UL} = \frac{M2}{M4 - M5} \quad (7)$$

$$\left(\frac{C}{I}\right) = \frac{M2}{M1 - M2 - M4} \quad (8)$$

Equation 6 represents the downlink SNR, Equation 7 represents the uplink SNR, and Equation 8 represents the carrier to interference ratio.

According to an embodiment of the present invention where gateway terminal 115 is configured to perform measurement M3 but not measurement M2, the components of the end-to-end SINR, the downlink SNR, the uplink SNR, and the carrier to interference (C/I) ratio may be computed using the following equations:

$$\left(\frac{S}{N}\right)_{DL} = \frac{M1}{M5}\frac{M3}{M3+1} \quad (9)$$

$$\left(\frac{S}{N}\right)_{UL} = \frac{M1}{M4-M5}\frac{M3}{M3+1} \quad (10)$$

$$\left(\frac{C}{I}\right) = \frac{M3 \cdot M1}{M1 - M4(1+M3)} \quad (11)$$

Equation 9 represents the downlink SNR, Equation 10 represents the uplink SNR, and Equation 11 represents the carrier to interference ratio.

Measurements M1, M2, M4, and M5 are absolute power measurements (not ratios like measurement M3) and are thus sensitive to absolute gain of gateway terminal 115's front end. In order to minimize or eliminate this sensitivity, each of the measurements M1, M2, M4, and M5 should be taken within as short as short an interval as possible. According to an embodiment, measurements M1, M2, M4, and M5 should be taken while the front end gain remains constant.

According to some embodiments of the present invention, only an occasional snapshot of system performance is desired and thus measurements may be taken only occasionally to provide a snapshot of the systems metrics for satellite communications system 100. According to other embodiments of the present invention, continuous monitoring of systems metrics is desired. In embodiments where continuous monitoring is desired, the measurements should be taken fast enough to track changes in the measurements.

For example, one of the quickest processes that may cause system metrics to change is rain fade. Rain fade refers to the absorption of a satellite signal by atmospheric rain, snow or ice, and may also refer to electromagnetic interference at the leading edge of a storm front. Rain fade may occur due to precipitation at an uplink or downlink location as the signal passes through precipitation en route to or from satellite 105. According to an embodiment, measurements are taken approximately once per second in order to track downlink rain fade events. According to another embodiment, measurements are taken approximately once per minute, which should provide sufficient information for tracking rain fade events at a macro level and for tracking diurnal variations in the link due to satellite movement.

According to some embodiments of the present invention, measurements M1, M2 and M3 may be taken continuously. However according to embodiments of the present invention, measurement M4 may be taken much less frequently than measurements M1, M2, and M3, because measurement M4 requires that gateway terminal 115 and user terminal 130 transmissions be disabled. According to an embodiment, satellite system 100 comprises a wideband system where accurate power measurements for measurement M4 can be acquired very rapidly. For example, if the system is operating at 420 million symbols per second (Msps), a 10 msec measurement interval would yield approximately 4 million symbols, which should be sufficient to provide a good estimate of the sum of the uplink thermal noise and the downlink thermal noise that comprises the M4 measurement. According to some embodiments of the present invention, the M4 measurement is taken once every second. If a 10 msec measurement interval is used, the outage time required to take measurement M4 only comprises 1% of the operating time of satellite system 100. According to other embodiments of the present invention, measurement M4 is taken once per minute, which in if a 10 msec measurement interval is used, the outage time required to take the measurement M4 only comprises 0.02% of the operating time of satellite system 100. According to some embodiments of the present invention, the outage time used for taking measurement M4 is built into the frame structure so that the outage occurs at a regular interval. According to other embodiments of the present invention, the outage time used for taking measurement M4 is periodically scheduled by a central control agent, such as command center 180, by disseminating a message to all Earth terminals (including both gateway terminals and user terminals).

All gateway terminals 115 and user terminals 130 must be synchronized so that their transmitters are disabled at precisely the same time in order for measurement M4 to be taken without any signal present. In embodiments of the present invention that include return channels employing time division multiple access (TDMA), the user terminals (UTs) are already synchronized. For satellite communications, such as satellite communications system 100, that include gateway terminals (GWs), the gateway terminals may not include synchronization functionality and the synchronization functionality must be added.

According to some embodiments, satellite communications system architectures, synchronization of the GWs can be difficult when a GW cannot receive its own transmission, which would allow the GW to measure the single hop satellite delay. One technique for synchronizing GW terminal transmissions, according to an embodiment of the present invention, is make a geometry-based calculation of the path delay based on the fixed known locations of the GWs and based on satellite ephemeris data, which may be easy obtained. The one way path delay combined with an accurate time base in each GW terminal can be used to synchronize GW terminal transmissions.

The M5 measurement involves sending a command to satellite 105 to disable all transmissions, which enables the total noise power measurement (N) to be divided into an uplink component ($N_{UL}$) and a downlink component ($N_{DL}$). Because this measurement M5 requires satellite 105 to disable all transmissions, measurement M5 may be obtained less frequently than measurements M1, M2, and M3. According to an embodiment of the present invention, if the satellite EIRP (including satellite pointing error), the terminal G/T (including pointing error), and the propagation loss (including rain fade) has not changed since the last time measurement M5 was taken, then the ratio of measurement M5 to measurement M4 will remain constant and can be expressed as the ratio M5/M4=$\gamma$. Thus, the value of M5 can be estimated using the following equation:

$$M5' = \gamma M4 \quad (12)$$

wherein $\gamma$ is the ratio of M5 to M4 at the last time that the M5 measurement was performed in a no rain environment, M4 is the most recent M4 measurement, and M5' is the estimated value of M5 that will be used instead of the M5 measurement. This technique for estimating the value of the M5 measurement may be used to significantly reduce the frequency at which the M5 measurement need to be performed, thereby reducing the frequency at which satellite 105 must be instructed to disable all transmissions. This technique allows generation of accurate SNR and C/I estimates during intervals where there is no rain or other precipitation that could result in rain fade. Rain or other precipitation may result in errors in the SNR and C/I estimates. If the satellite EIRP has varied since the last M5 measurement, the estimated value of M5 will also be in error, resulting in errors in the SNR and C/I estimates.

According to another embodiment of the present invention, M5 measurements are taken without sending a command to the satellite to disable all transmissions, enabling frequent M5 measurements to be taken without disrupting service on satellite communications system 100. M5 measurements may be taken by measuring the noise power in a portion of the spectrum in which the satellite is not radiating any energy. For example, M5 measurements may be taken outside of the passband of the satellite channel. This technique does not require that commands be sent to the satellite to change attenuators as in the other embodiments disclosed above, but gateway terminal 115 must be able to tune to a portion of the spectrum where the satellite does not radiate any power. Before using an M5 measurement made using this technique in equations (6)-(11), the measured out of band noise power should be adjusted by the ratio of the in band measurement bandwidth (M4 measurement) to the out of band measurement bandwidth.

When using the out of band technique to make the M5 measurement, the gateway terminal may have a different system noise temperature and/or electronic gain at the out of band frequency than at the in band frequency. These differences are primarily due to the frequency response of the low noise amplifier (LNA), downconverter, modem, and cabling connect the outdoor electronics, such as antenna 110, to the indoor electronics, such as gateway terminal 115. In order for the M5 measurement to be accurately determined using the out of band technique, the difference in noise levels between the out-of-band and the in-band frequencies must be known and a correction to the out of band measurement applied. According to an embodiment of the present invention, M5 may be computed as M5=P5·Δ, where P5 represents the out-of-band power measurement and Δ represents the compensation factor. The compensation factor includes the known ratio of in-band noise level to the out-of-band noise level as well as the ratio of the in-band to out-of-band measurement bandwidths.

The compensation factor Δ typically is not known and must be determined by an gateway terminal, such as gateway terminal 115. According to an embodiment of the present invention, the following technique may be used to determine Δ. This technique is typically applied during "scheduled maintenance" periods. The technique includes periodically sending a command to satellite 105 instructing the satellite to significantly attenuate all transmissions for a short period of time. According to an embodiment, command center 180 sends the command to satellite 105 to attenuate all transmissions. According to some embodiments, the transmission of the command to the satellite may be scheduled to occur at a predetermined interval. According to other embodiments of the present invention, the command may be issued to the satellite on an ad hoc basis by command center 180. For example, the command may be issued for the purpose of measuring system metrics and/or for performing maintenance on the satellite communications system.

According to some embodiments of the present invention, commands may also be sent to all gateway terminals 115 and user terminals 130 to disable uplink transmission from the gateway terminals. Disabling uplink transmissions from gateway terminals 115 and user terminals 130 reduces the level off attenuation requirements of satellite 105.

During the quiet interval resulting from the commands being issued to satellite 105 and in some embodiments, to gateway terminals 115 and user terminals 130, all gateway terminals are configured to measure both the in-band noise power and the out-of-band noise power using the same measurement bandwidths that are used when regular M4 and M5 are made. The duration of the quiet interval should be sufficient to allow accurate power measurements to be made. According to an embodiment of the present invention, the duration of the quiet interval should be less than one second.

After measuring the in-band noise power and the out-of-band noise power, each gateway terminal computes the ratio of the in-band noise power to out-of-band noise power to form the compensation factor Δ. The computed value of Δ is used for all M5 measurements until the next scheduled maintenance period where the value of Δ is again determined.

The compensation factor Δ for each gateway terminal 115 is not expected to change very much or very often, if ever at all. Thus, the "scheduled maintenance" interval does not need to occur very frequently. According to an embodiment of the present invention, a frequency of once a month is sufficient to keep the compensation factor Δ updated and accurate.

As new gateway terminals 115 are added to satellite communications system 100, the new terminals cannot participate in the SNR and C/I estimation process until the new terminals have completed a Δ calculation in a scheduled maintenance interval. Thus, scheduled maintenance intervals should be frequent enough to enable newly provisioned gateway terminals to participate in the SNR and C/I estimation process. According to an embodiment of the present invention, a frequency of once a month is sufficient to enable newly provisioned gateway terminals to participate in the SNR and C/I estimation process.

Figure 2:
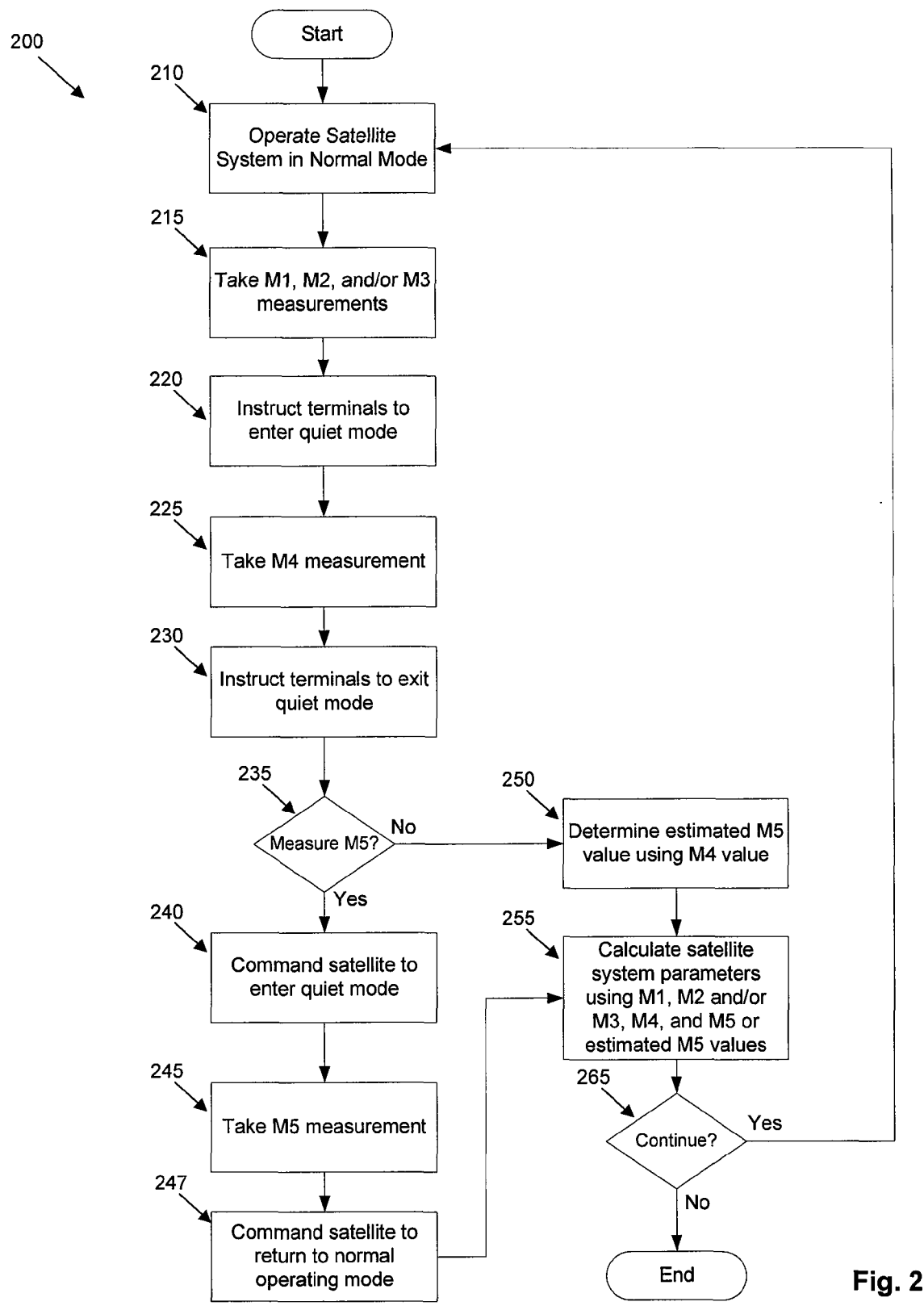
FIG. 2 is a high level flow diagram of a method for calibrating a satellite communications system according an embodiment of the present invention.

FIG. 2 is a high level flow diagram of a method 200 for calibrating a satellite communications system using the techniques described above according an embodiment of the present invention. Method 200 uses in-band measurements to determine the value of measurement M5. Method 200 begins with step 210 where the satellite communication system, such as satellite communication system 100, is operated in a normal operating configuration where the satellite and gateway terminal transmissions are enabled. At step 215, measurements M1, M2, and/or M3 (represented by equations (1)-(3)) are obtained using the techniques described above while the satellite communications system is in the normal operating configuration. At step 220, a command is sent to each of the plurality of gateway terminals 115 and user terminals 130 to disable the uplink transmissions from the gateway terminals and the user terminals. At step 225, measurement M4 is obtained using the techniques described above. Measurement M4 (represented by equation (4)) includes both the uplink thermal noise generated by satellite 105 and downlink thermal noise generated with an gateway terminal 115. According to an embodiment, measurement M4 is taken after a single hop delay after the uplink transmission from gateway terminal 115 have been disabled. At step 230, gateway terminals 115 and user terminals 130 are instructed to return to normal operating configuration. According to some embodiments, the commands to the gateway terminals 115 and user terminals 130 to disable and reenable the uplink transmissions are provided to the gateway terminals by command center 180 via network 120.

At step 235, a determination is made whether to perform the M5 measurement or to determine an estimated M5 value based on the ratio of a previous M5 value. Taking the M5 measurement involves sending a command to satellite 105 to disable all transmission. Since this disrupts the operation of the satellite communications system, the M5 measurement may be obtained much less frequently than measurements M1, M2, M3 and M4.

If measurement M5 is to be measured, method 200 proceeds to step 240, where the communications satellite 105, gateway terminals 115, and user terminals 130 are instructed to disable all transmissions. After satellite 105, gateway terminals 115, and user terminals 130 have been instructed to enter this "quiet" mode, the M5 measurement is obtained using the techniques described above (step 245). After taking the M5 measurement, the communications satellite and the Earth terminals are commanded to return to normal operating configuration (step 247). Method 200 then proceeds to step 255, where satellite system parameters are calculated based on the values of measurements M1, M2 and/or M3, M4, and M5. According to other embodiments of the present invention, calculation step 255 may be performed more frequently. For example, calculation step 255 might also be performed after step 215 and/or step 230. The satellite system parameters may then be used to optimize the operating conditions of the satellite broadcast system.

At step 235, if the M5 measurement is to be estimated, method 200 proceeds to step 250, where an estimated value is determined for M5 based on the value of M4 obtained in step 225 and a previously determined value of M5 according to the techniques described above. After step 250, method 200 proceeds to step 250 where the satellite communication system is calibrated using the values of measurements M1, M2 and/or M3, M4, and the estimated value for measurement M5.

After step 255, method 200 proceeds to step 265 where a determination is made whether to continue monitoring the operation of the satellite communication system. If additional monitoring of the operation of the satellite communication system is to be performed, method 200 returns to step 210. Otherwise, method 200 terminates.

Figure 3:
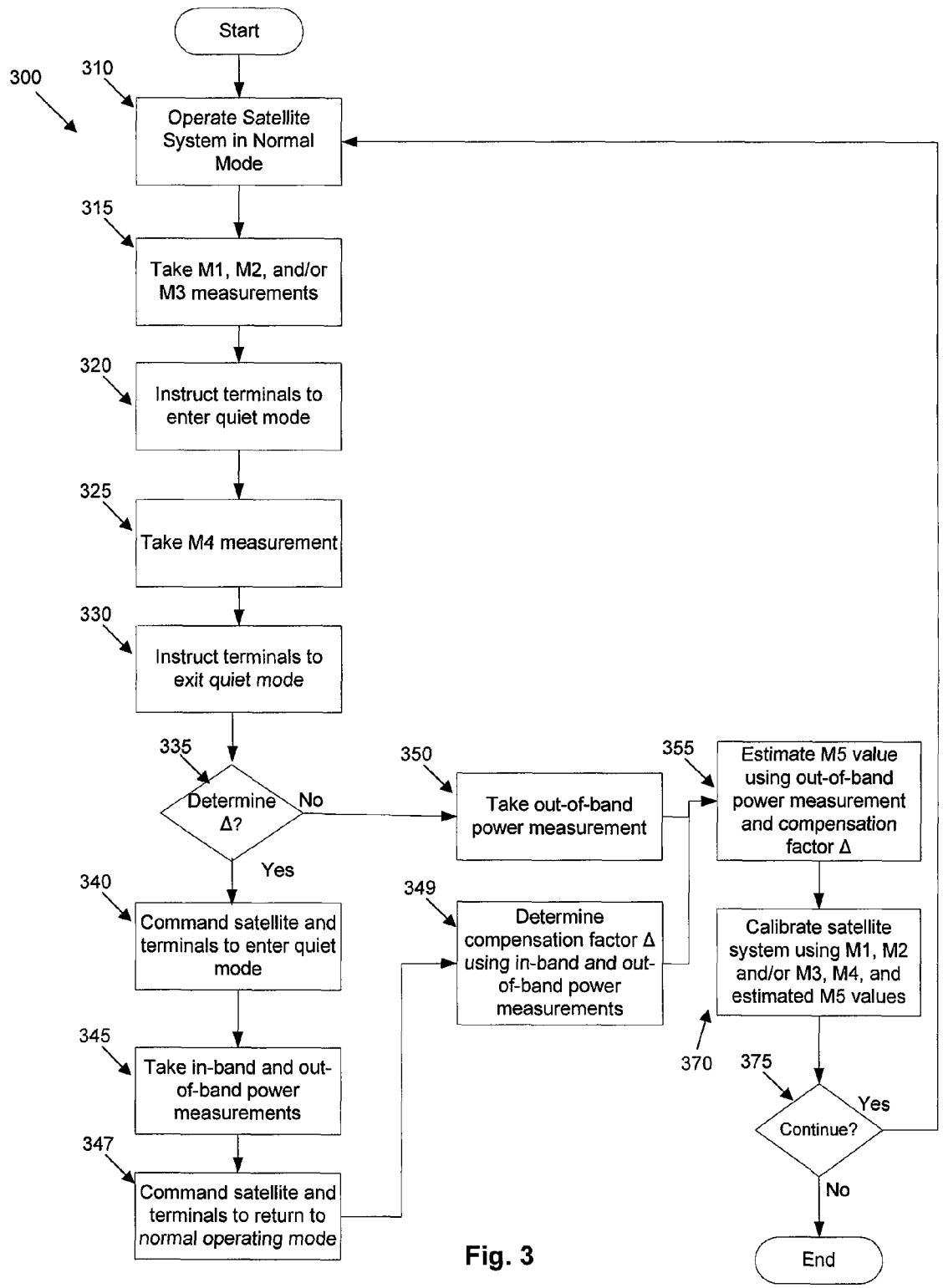
FIG. 3 is a high level flow diagram of a method for calibrating a satellite communications system according an embodiment of the present invention.

FIG. 3 is a high level flow diagram of a method 300 for calibrating a satellite communications system using the techniques described above according another embodiment of the present invention. Method 300 uses an out-of-band technique for making M5 measurements that enables frequent M5 measurements to be taken without disrupting service on the satellite communications system by measuring the noise power in a portion of the spectrum in which the satellite is not radiating any energy.

Method 300 begins with step 310 where the satellite communication system, such as satellite communication system 100, is operated in a normal operating configuration where the satellite and gateway terminal transmissions are enabled. At step 315, measurements M1, M2, and/or M3 (represented by equations (1)-(3)) are obtained using the techniques described above while the satellite communications system is in the normal operating configuration. At step 320, a command is sent to each of the plurality of gateway terminals 115 and user terminals 130 to disable the uplink transmissions from the gateway terminals and the user terminals. At step 325, measurement M4 is obtained using the techniques described above. Measurement M4 (represented by equation (4)) includes both the uplink thermal noise generated by satellite 105 and downlink thermal noise generated with an gateway terminal 115. According to an embodiment, measurement M4 is taken after a single hop delay after the uplink transmission from gateway terminal 115 have been disabled.

At step 330, gateway terminals 115 and user terminals 130 are instructed to return to normal operating configuration. According to an embodiment, the commands to the gateway terminals 115 and user terminals 130 to disable and reenable the uplink transmissions are provided to the gateway terminals by command center 180 via network 120.

M5 may be computed as $M5 = P5 \cdot \Delta$, where P5 represents the out-of-band power measurement and $\Delta$ represents the compensation factor. Determining the value of the compensation factor $\Delta$ requires that satellite 105 be put into a "quiet" mode where all satellite transmission are disabled. Gateway terminals 115 and user terminals 130 may also be commanded to disable all transmissions while the compensation factor $\Delta$ is determined. Because this interrupts the operation of the satellite communication system, the value of the compensation factor $\Delta$ typically will only be determined periodically and be used to estimate the value of M5 by multiplying the compensation factor $\Delta$ by a current measurement of P5, which does not require that transmissions from satellite 105 be interrupted. At step 335, a determination is made whether to determine the compensation factor $\Delta$ or to determine an estimated value for M5 value based on a previously obtained compensation factor $\Delta$.

If compensation factor $\Delta$ is to be determined, method 300 proceeds to step 340, where the communications satellite 105 is instructed to disable all transmissions. Gateway terminals 115 and user terminals 130 may also be commanded to disable all transmissions. After satellite 105, gateway terminals 115, and user terminals 130 have been instructed to enter this "quiet" mode, in-band and out-of-band power measurements are taken by an gateway terminal according to the techniques described above (step 345). After taking the in-band and out-of-band power measurements, the communications satellite and the gateway and user terminals are commanded to return to normal operating configuration (step 347). Method 300 then proceeds to step 349, where the compensation factor $\Delta$ is determined using the techniques described above. After determining the compensation factor $\Delta$, method 300 continues with step 355, where an estimated of measurement M5 is determined using the techniques described above. After completing step 355, method 300 proceeds to step 370 where satellite system parameters are calculated based on the values of measurements M1, M2 and/or M3, M4, and M5. According to other embodiments of the present invention, calculation step 370 may be performed more frequently. For example, calculation step 370 might also be performed after step 315 and/or step 330. The satellite system parameters may then be used to optimize the operating conditions of the satellite broadcast system.

At step 335, if the M5 measurement is to be estimated using a previously determined compensation factor $\Delta$, method 300 proceeds to step 350, where an out-of-band power measurement is obtained while satellite 105 is operating in a normal operating mode. Method 300 then proceeds to step where an estimate of measurement M5 is determined using the previously determined compensation factor $\Delta$ and the out-of-band power measurement obtained in step 350 using the techniques described above. Method 300 then proceeds to step 370.

After step 370, method 300 proceeds to step 375 where a determination is made whether to continue monitoring the operation of the satellite communication system. If additional monitoring of the operation of the satellite communication system is to be performed, method 300 returns to step 310. Otherwise, method 300 terminates.

Determining Satellite EIRP and Terminal Pointing Loss

Equation 13 illustrates the relationship between the downlink SNR and the satellite EIRP:

$$\left(\frac{S}{N}\right)_{DL} = \frac{EIRP_{sat}}{L_p}\left(\frac{G}{T}\right)_{ET}\frac{1}{k}\frac{1}{R_{sym}} \quad (13)$$

In equation (13), $R_{sym}$ represents the symbol rate of the link, which may be different for the forward link and for the return link, k represents Boltzmann's constant, $(G/T)_{ET}$ represents the G/T of the gateway terminal including any pointing loss, $EIRP_{sat}$ at represents the satellite EIRP allocated to the symbol stream and in the direction of the gateway terminal, and $L_p$ represents the propagation loss including any rain loss. Equation (14) is derived from equation (13) by taking 10 times the Log of equation (13) and rearranging the results:

$$[EIRP_{sat}] + \left[\left(\frac{G}{T}\right)_{ET}\right] = [R_{sym}] + [k] + [L_p] + \left[\left(\frac{S}{N}\right)_{DL}\right] \quad (14)$$
$$= [C(n)], 1 \le n \le N$$

where the notation [x] represents 10 Log 10(x). The right-hand side of equation (14) consists of known quantities when downlink SNR determined using equations (6) or (9) is used. Hence, equation (14) may be used to accurately determine the sum of the gateway terminal G/T (in dB/K) and the satellite EIRP (in dBW) when it is not raining. According to an embodiment, for return links, the gateway terminal is a gateway terminal, which are typically carefully installed and have an accurate auto track pointing system, and thus have a well-known G/T. Thus, the satellite EIRP is easily derived using the technique describe above.

For the forward link, the gateway terminal is a user terminal that does not have an auto tracking point system and may not have a non-trivial amount of pointing error. However, the boresight G/T of the user terminal is generally fairly accurately known. According to an embodiment the present invention, the satellite EIRP and pointing loss for each user terminal may be derived by examining data from many user terminals in locations where the satellite EIRP is expected to be approximately the same value. According to an embodiment of the present invention, equation (15) illustrates a technique for determining the pointing loss of user terminals. Data is collected from N identical user terminals at locations with identical satellite EIRP values and the G/T with pointing loss may be expressed as a boresight G/T plus a pointing loss term according to equation (15):

$$[EIRP_{sat}] + \left[\left(\frac{G}{T}\right)_{ideal}\right] - [L_{point}(n)] = [C(n)], 1 \le n \le N \quad (15)$$

where $[L_{point}(n)]$ represents the pointing loss of the $n^{th}$ user terminal of N user terminals, where N is a positive integer greater than 1, and [C(n)] is the constant from the right-hand side of equation (14) using the downlink SNR calculation for the $n_{th}$ user terminal. $EIRP_{sat}$ is unknown but is constant for all n, $(G/T)_{ideal}$ represents the boresight G/T of the user terminal and is known and constant, $L_{point}(n)$ is not known, and C(n) is known from the downlink S/N calculation for all n user terminals.

When surveying a large population of user terminals, at least one of the user terminals is likely to have a very small and insignificant pointing loss. According to an embodiment of the present invention, by using the user terminal SNR measurement that results in the largest value of [C(n)] in equation (15) with an assumed zero pointing loss error, the value of $EIRP_{sat}$ can be calculated. The pointing loss for the other terminals may then be calculated using equation (15) using the determined value of $EIRP_{sat}$.

Figure 4:
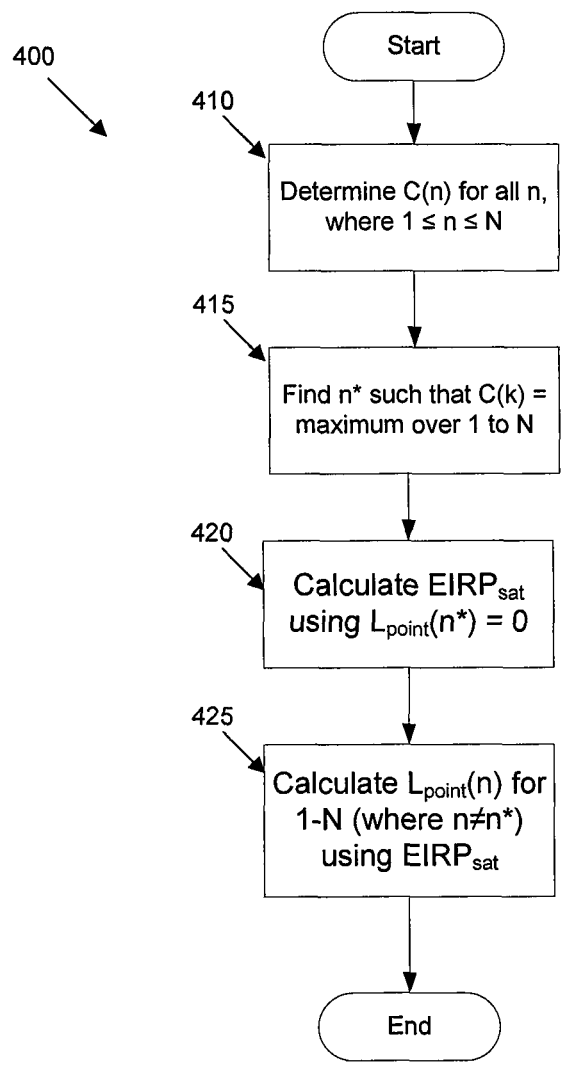
FIG. 4 is a high level flow diagram of method for determining terminal pointing loss using satellite EIRP.

FIG. 4 is a high level flow diagram of method 400 for determining terminal pointing loss using satellite EIRP using the techniques described above according to an embodiment of the present invention. Method 400 begins with step 410, where the value of C(n) is determined for each of N user terminals. At step 415, a maximum value of C(n) is determined from the values of C(n) determined in step 410. This value will be used as a "gold standard" for determining the pointing losses of the other user terminals. In step 420, the EIRP of the satellite is determined with the assumption that the pointing loss of the n*th user terminal is zero (the n*th user terminal represents the user terminal having the largest value of C(n) determined in step 415). Once the EIRP of the satellite has been determined, the pointing loss of each of the other user terminals of the N user terminals may be determined (step 425). After completing step 425, method 400 terminates.

Determining Satellite G/T

The uplink SNR is related to the gateway terminal EIRP and satellite G/T. According to an embodiment of the present invention, equation (16) illustrates the relationship between the uplink SNR, the gateway terminal EIRP, and satellite G/T:

$$\left(\frac{S}{N}\right)_{UL} = \frac{EIRP_{ET}}{L_p}\left(\frac{G}{T}\right)_{Sat}\frac{1}{k}\frac{1}{R_{sym}} \quad (16)$$

Using the calculated uplink SNR, the sum of the user EIRP and the satellite G/T can be determined using the equation (17):

$$[EIRP_{ET}] + \left[\left(\frac{G}{T}\right)_{Sat}\right] = [R_{sym}] + [k] + [L_p] + \left[\left(\frac{S}{N}\right)_{UL}\right] \quad (17)$$

where $EIRP_{ET}$ represents the EIRP in the direction of the satellite and includes pointing loss, $G/T_{sat}$ represents the EIRP in the direction of the gateway terminal, and $L_p$ represents the propagation loss including any rain loss. In equation (17), the right-hand side of the equation consists of quantities that are known (when there is no rain loss) and the left-hand side of the equation consists of quantities that may not be known.

For the return channel, the $EIRP_{ET}$ corresponds to the gateway terminal. A gateway terminal generally has the high power amplifier (HPA) output coupled to a power meter, so the HPA output is accurately known. Antenna gain is also generally accurately known and an autotrack pointing system employed to keep the pointing error very small. Hence, the gateway terminal EIRP is accurately known, thereby enabling the calculation of the satellite G/T in the direction of the gateway.

The EIRP is generally not accurately known for low cost user terminals, since a power meter is typically not included as part of low cost user terminals. However, if the satellite G/T is accurately known (or is assumed), then equation (17) may be used to determine the EIRP of each user terminal. However, if the satellite EIRP is not accurately known, the user terminal EIRP and the satellite G/T cannot be determined.

According to an embodiment of the present invention, one solution to this problem is to employ one or more "advanced" user terminals or diagnostic terminals within the beam. The advanced terminals should include both accurate power measurement capability and accurate pointing capability. An accurate estimate of the EIRP for the advanced terminal can be determined by collection of the power meter measurement for the terminal. This value can then be used with equation (17) to determine the satellite G/T. Once the satellite G/T has been determined, the EIRP for all other user terminals can then be determined.

The disclosure provides various techniques for monitoring the performance of a satellite communication system including measuring the primary contributors to the end-to-end SNR, such as the uplink SNR, the downlink SNR, and the C/I for each link in the network. Techniques for deriving the estimate satellite effective isotropic radiated power (EIRP), satellite antenna gain-to-noise-temperature (G/T), and loss due to an gateway terminal pointing error from the uplink SNR, the downlink SNR, and the C/I for each link in the network are also provided. The various performance measurements derived using these techniques may then be used to optimize the configuration of the satellite network to provide optimal throughput. The various measurement obtained through the techniques described above may be used to configure the satellite system to provide optimal throughput.

While the embodiments described above may make reference to specific hardware components, those skilled in the art will appreciate that different combinations of hardware and/or software components may also be used and that particular operations described as being implemented in hardware might also be implemented in software or vice versa.

Thus, although the invention has been described with respect to specific embodiments, it will be appreciated that the invention is intended to cover all modifications and equivalents within the scope of the following claims.

What is claimed is:

1. A method used on a satellite communication system, wherein the satellite communications system includes a satellite, at least one gateway terminal and a plurality of user terminals, the method comprising:
measuring, at the at least one gateway terminal, a total receive power of a signal received from the satellite under normal operating conditions;
measuring one of a signal-only power and a signal-to-noise-plus-interference ratio (S1NR) for a signal received from the satellite under normal operating conditions;
measuring a total thermal noise component of the signal received from the satellite during a first quiet interval where uplink transmission from the at least one gateway and the plurality of user terminals have been disabled;
measuring a first out-of-band downlink thermal noise component and a first in-band downlink thermal noise component while the satellite is in a transmission disabled state;
determining a compensation factor using the first in-band downlink thermal noise component and the first out-of-band downlink thermal noise component;
measuring a second out-of-band downlink thermal noise component while the satellite is under normal operating conditions;
estimating a second in-band downlink thermal noise component of the signal received from the satellite by multiplying the second out-of-band downlink thermal noise component by the compensation factor; and
calculating satellite communication system operating parameters during satellite operation using the total receive power, the signal-only power or the SINR, measurements of the total thermal noise component, and the second in-band downlink thermal noise component for monitoring the performance of the satellite communication system in which the satellite is operating.

2. The method of claim 1 further comprising:
commanding the at least one gateway terminal and the plurality of user terminals to disable all transmissions prior to measuring the total thermal noise component of the signal received from the satellite; and
commanding the at least one gateway terminal and the plurality of user terminals to enable transmissions after measuring the total thermal noise component of the signal received from the satellite.

3. The method of claim 2 wherein an outage time used for measuring the total thermal noise component of the signal received from the satellite is built into a frame structure of the satellite communications system so that the outage time occurs at a regular interval.

4. The method of claim 2, further comprising:
scheduling an outage time for measuring the total thermal noise component of the signal received from the satellite, wherein the outage time is scheduled by a central control agent of the satellite broadcast system.

5. The method of claim 4 wherein scheduling an outage time for measuring the total thermal noise component of the signal received from the satellite further comprises:
commanding the at least one gateway terminal and the plurality of user terminals to disable all transmissions for an interval specified in a message.

6. The method of claim 2 wherein commanding the at least one gateway terminal to disable all transmissions prior to measuring the total thermal noise component of the signal received from the satellite further comprises:
calculating a path delay to the satellite from the at least one gateway terminal based on the location of the at least one gateway terminal and ephemeris data of the satellite; and
synchronously disabling the at least one gateway terminal with the disabling of the plurality of the user terminals using the path delay and an accurate time base of the at least one gateway terminal.

7. The method of claim 1, further comprising:
commanding the satellite to disable all transmissions prior to measuring the first in-band downlink thermal noise component and the first out-of-band downlink thermal noise component; and
commanding the satellite to enable transmissions after measuring the first in-band downlink thermal noise component and the first out-of-band downlink thermal noise component.

8. The method of claim 1 further comprising:
commanding the satellite, the at least one gateway terminal, and the plurality of user terminals to disable all transmissions prior to measuring the first in-band downlink thermal noise component and the first out-of-band downlink thermal noise component; and
commanding the satellite, the at least one gateway terminal, and the plurality of user terminals to enable transmissions after measuring the first in-band downlink thermal noise component and the first out-of-band downlink thermal noise component.

9. The method of claim 1 wherein both the signal only power of the signal received from the satellite under normal operating conditions and the SINR for the signal received from the satellite under normal operating conditions are measured.

* * * * *